United States Patent
Liu

(10) Patent No.: US 10,867,030 B2
(45) Date of Patent: *Dec. 15, 2020

(54) METHODS AND DEVICES FOR EXECUTING TRUSTED APPLICATIONS ON PROCESSOR WITH SUPPORT FOR PROTECTED EXECUTION ENVIRONMENTS

(71) Applicant: Advanced New Technologies Co., Ltd., Grand Cayman (KY)

(72) Inventor: Xiaojian Liu, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/887,654

(22) Filed: May 29, 2020

(65) Prior Publication Data

US 2020/0334354 A1 Oct. 22, 2020

Related U.S. Application Data

(63) Continuation of application No. 16/773,187, filed on Jan. 27, 2020, now Pat. No. 10,733,285, which is a
(Continued)

(51) Int. Cl.
*G06F 21/53* (2013.01)
*G06F 21/57* (2013.01)
*G06F 9/30* (2018.01)

(52) U.S. Cl.
CPC .......... *G06F 21/53* (2013.01); *G06F 9/30029* (2013.01); *G06F 21/57* (2013.01); *G06F 2221/033* (2013.01)

(58) Field of Classification Search
CPC ............. G06F 21/53; G06F 21/57–577; G06F 21/602; G06F 21/6218–6281;
(Continued)

(56) References Cited

U.S. PATENT DOCUMENTS

2003/0200450 A1* 10/2003 England ............... G06F 21/6218
713/189
2012/0331307 A1 12/2012 Gutierrez
(Continued)

FOREIGN PATENT DOCUMENTS

CN 105684009 A 6/2016
CN 102473224 B 10/2016
(Continued)

OTHER PUBLICATIONS

Written Opinion of the International Searching Authority of PCT Application No. PCT/CN2019/083466, dated Jan. 16, 2020, issued by the ISA/CN—National Intellectual Property Administration, PRC, China.
(Continued)

*Primary Examiner* — Kevin Bechtel
(74) *Attorney, Agent, or Firm* — Finnegan, Henderson, Farabow, Garrett & Dunner, L.L.P.

(57) ABSTRACT

Disclosed herein are methods, devices, and apparatuses, including computer programs stored on computer-readable media, for executing applications. One of the methods includes: establishing an enclave in a first physical processing unit of a processor; recording a first trust declaration declared by a first application, the first trust declaration declaring whether the first application trusts any application
(Continued)

to execute with the first application on the first physical processing unit; assigning the first application to a first logical processing unit hosted on the first physical processing unit; providing a set of enclave entry instructions for the first logical processing unit to execute, to cause the first logical processing unit to enter the enclave when a predefined entering condition is satisfied; and providing a set of enclave exit instructions for the first logical processing unit to execute, to cause the first logical processing unit to exit the enclave when a predefined exiting condition is satisfied.

19 Claims, 9 Drawing Sheets

Related U.S. Application Data continuation of application No. PCT/CN2019/083466, filed on Apr. 19, 2019.

(58) Field of Classification Search
CPC .................. G06F 21/71; G06F 21/74; G06F 2009/45587; G06F 2221/03–034; G06F 2221/2113

See application file for complete search history.

(56) References Cited

U.S. PATENT DOCUMENTS

| | | |
|---|---|---|
| 2016/0350534 A1 | 12/2016 | Poornachandran et al. |
| 2018/0088976 A1 | 3/2018 | Leslie-Hurd et al. |
| 2018/0114013 A1* | 4/2018 | Sood .................. G06F 21/572 |
| 2018/0204025 A1 | 7/2018 | Chhabra et al. |
| 2019/0042671 A1* | 2/2019 | Caspi .................. G06F 12/1009 |
| 2019/0251257 A1* | 8/2019 | McKeen .............. G06F 12/1491 |

FOREIGN PATENT DOCUMENTS

| | | |
|---|---|---|
| CN | 108959932 A | 12/2018 |
| WO | WO 2017/082966 A1 | 5/2017 |

OTHER PUBLICATIONS

International Search Report of PCT Application No. PCT/CN2019/083466, dated Jan. 16, 2020, issued by the ISA/CN—National Intellectual Property Administration, PRC, China.

Extended European Search Report for Application No. 19732217.5, dated Jun. 5, 2020.

* cited by examiner

METHODS AND DEVICES FOR EXECUTING TRUSTED APPLICATIONS ON PROCESSOR WITH SUPPORT FOR PROTECTED EXECUTION ENVIRONMENTS

CROSS REFERENCE TO RELATED APPLICATIONS

This application is a continuation of U.S. application Ser. No. 16/773,187, filed on Jan. 27, 2020, which is a continuation of International Application No. PCT/CN2019/083466, filed Apr. 19, 2019, the entire contents of all of which are incorporated herein by reference.

TECHNICAL FIELD

The specification relates generally to computer technologies, and more particularly, to methods and devices for executing trusted applications on a processor with support for protected execution environments.

BACKGROUND

A processor is circuitry that can be used to carry out instructions specified in a computer program. The processor may include an arithmetic logic unit (ALU) that performs arithmetic and logic operations. The processor may also include registers that supply operands to the ALU and store results produced by the ALU. The processor may further include a control unit that coordinates the operations of the ALU, the registers, and other components, including, e.g., one or more levels of cache, one or more levels of translation lookaside buffers (TLBs), and one or more memory controllers.

Multiple processors may be packaged together to form a multi-core processor. Each processor contained in a multi-core processor may be referred to as a physical processing unit, or a "core." These physical processing units may support multithreading, meaning that each physical processing unit may execute two or more sets of operations or applications in parallel. Various techniques may be utilized to implement multithreading, including, e.g., time sliced multithreading (where a physical processing unit rapidly switches between applications executing on the physical processing unit according to a predefined time interval, e.g., every processing cycle), simultaneous multithreading (where each physical processing unit can host multiple logical processing units, one for each application executing on that physical processing unit), or a combination thereof. Intel® Hyperthreading technology is a multithreading technology that uses a combination of time sliced multithreading and simultaneous multithreading. Specifically, Intel® Hyperthreading uses time sliced multithreading to fetch and decode operations and uses simultaneous multithreading thereafter to carry out the executions.

Logical processing units are typically presented to the applications executing thereon as being logically indifferent from the underlying physical processing unit hosting them. In reality, however, logical processing units may not have full control over some of the resources available on the physical processing unit. For example, if a physical processing unit needs to host multiple logical processing units to support simultaneous multithreading of multiple applications, often times the physical processing unit may set up the logical processing units to share some resources, such as the level 1 (L1) cache, L1 TLB, or the like. Sharing resources in this manner may expose certain types of data to intruders.

For example, suppose that a physical processing unit provides a first logical processing unit to handle execution of Application A and a second logical processing unit to handle execution of Application B, and further suppose that the physical processing unit sets up the two logical processing units to share the L1 cache, Application B may then be able to gain access to data stored by Application A in the L1 cache, and vice versa.

Extensions to processors, such as the Intel® Software Guard Extensions (SGX) and the like, may provide some protections for Applications A and B. Even processors enabled with these extensions, however, are still vulnerable to attacks. Security vulnerabilities such as Spectre, L1 Terminal Fault (L1TF), and the like have been discovered in recent years. Other potential vulnerabilities may be discovered in the future. One possible solution to avoid these attacks is to disable simultaneous multithreading. In this manner, the problem associated with Application A and Application B sharing the L1 cache, as described in the example above, can be eliminated. However, this solution reduces the number of logical processing units to be the same as the number of physical processing units, which in turn reduces the multithreading capabilities of the processors. Therefore, there is a need for a method to improve data security for applications executing on processors that support simultaneous multithreading.

SUMMARY

In one aspect, a computer-implemented method for executing applications includes: establishing an enclave in a first physical processing unit of a processor; recording a first trust declaration declared by a first application, the first trust declaration declaring whether the first application trusts any application to execute with the first application on the first physical processing unit; assigning the first application to a first logical processing unit hosted on the first physical processing unit; providing a set of enclave entry instructions for the first logical processing unit to execute, to cause the first logical processing unit to enter the enclave when a predefined entering condition is satisfied; and providing a set of enclave exit instructions for the first logical processing unit to execute, to cause the first logical processing unit to exit the enclave when a predefined exiting condition is satisfied.

In another aspect, a device for executing applications includes: a processor including one or more physical processing units; and a computer-readable instruction code storage coupled to the one or more physical processing units and having instructions stored thereon, wherein the instructions are executable by the one or more physical processing units to: establish an enclave in a first physical processing unit of the processor; record a first trust declaration declared by a first application, the first trust declaration declaring whether the first application trusts any application to execute with the first application on the first physical processing unit; assign the first application to a first logical processing unit hosted on the first physical processing unit; provide a set of enclave entry instructions for the first logical processing unit to execute, to cause the first logical processing unit to enter the enclave when a predefined entering condition is satisfied; and provide a set of enclave exit instructions for the first logical processing unit to execute, to cause the first logical processing unit to exit the enclave when a predefined exiting condition is satisfied.

In still another aspect, a non-transitory computer-readable medium have stored therein instructions that, when executed by a processor of a device, cause the device to perform a method for executing applications. The method includes: establishing an enclave in a first physical processing unit of the processor; recording a first trust declaration declared by a first application, the first trust declaration declaring whether the first application trusts any application to execute with the first application on the first physical processing unit; assigning the first application to a first logical processing unit hosted on the first physical processing unit; providing a set of enclave entry instructions for the first logical processing unit to execute, to cause the first logical processing unit to enter the enclave when a predefined entering condition is satisfied; and providing a set of enclave exit instructions for the first logical processing unit to execute, to cause the first logical processing unit to exit the enclave when a predefined exiting condition is satisfied.

BRIEF DESCRIPTION OF THE DRAWINGS

The accompanying drawings, which are incorporated in and constitute a part of this specification, illustrate embodiments. In the following description, which refers to the drawings, the same numbers in different drawings represent the same or similar elements unless otherwise represented.

DETAILED DESCRIPTION

Embodiments of the specification provide methods and devices for executing applications on processors with support for protected execution environments, referred to herein as "enclaves." The methods and devices provide applications, including, e.g., user-level applications, with the abilities to declare whether they trust any applications to execute with them on the same physical processing unit. The methods and devices also provide processors with the abilities to control how applications, including user-level applications, enter and exit enclaves. In some embodiments, the methods and devices utilize instruction code built into the processors to facilitate declarations of trusted applications. In some embodiments, the methods and devices utilize the instruction code built into the processors to control how applications enter and exit enclaves.

Embodiments disclosed in the specification have one or more technical effects. In some embodiments, the methods and devices utilize instruction code built into the processors to facilitate declarations of trusted applications. This improves security because the processors can use their built-in instruction code to ensure, at the hardware-level, that only trusted applications can execute on the same physical processing unit. In some embodiments, the methods and devices utilize instruction code built into the processors to control how applications enter and exit enclaves. This further improves security because the processors can enforce entry and exit policies without being influenced by any applications executing thereon. Practically, the methods and devices allow applications, including user applications, to declare if they trust any applications to execute with them on the same physical processing unit. In this manner, only trusted applications are allowed to execute on the same physical processing unit, eliminating the possibility of an intruder gaining access to an application's protected execution environment. The methods and devices also allow the processors to operate without having to disable their multithreading capabilities.

Figure 1:
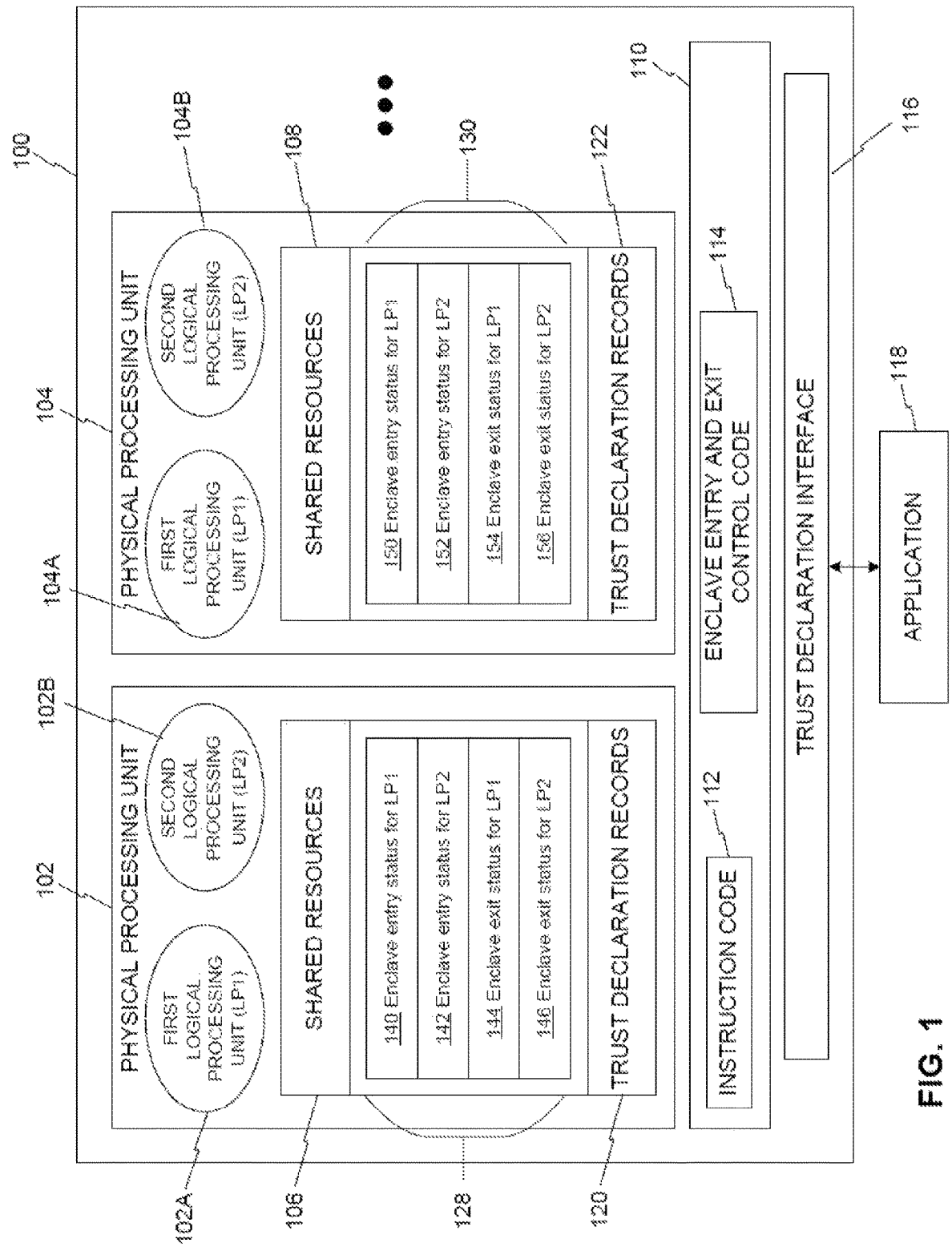
FIG. 1 is a schematic diagram of a processor, according to an embodiment.

FIG. 1 illustrates a schematic diagram of a processor 100, according to an embodiment. Referring to FIG. 1, the processor 100 may include one or more physical processing units, e.g., physical processing units 102 and 104, each implemented with circuitry that can be used to carry out instructions specified in computer programs. These physical processing units 102 and 104 may be referred to as "cores." If the processor 100 includes only one such physical processing unit, or core, the processor 100 may be referred to as a single-core processor. If the processor 100 includes multiple physical processing units, or cores, the processor 100 may be referred to as a multi-core processor. In some embodiments, the processor 100 may include multiple physical processing units packaged together as a single integrated circuit. In some embodiments, the processor 100 may operate in a computing device that serves as a node in a network of nodes. In some embodiments, the network of nodes may form a blockchain network.

In some embodiments, at least one of the physical processing units 102 and 104 may have the ability to support multithreading by hosting multiple logical processing units. In the example depicted in FIG. 1, both the physical processing units 102 and 104 have the ability to support multithreading by hosting, e.g., two logical processing units. In this manner, the physical processing unit 102 may support simultaneous multithreading of two applications. The physical processing unit 102 may present itself as a first logical processing unit 102A to a first application. The first logical processing unit 102A may load and carry out the instructions specified in the first application. The physical processing unit 102 may also present itself as a second logical processing unit 102B to a second application. The second logical processing unit 102B may load and carry out the instructions specified in the second application. Similarly, the physical processing unit 104 may also support simultaneous multithreading of two applications. The physical processing unit 104 may present itself as one logical processing unit 104A to one application and also present itself as another logical processing unit 104B to another application.

In some embodiments, the physical processing units 102 and 104 may require their respective logical processing units to share certain resources 106 and 108. For example, the physical processing unit 102 may require its first and second logical processing units 102A and 102B to share certain memory spaces, including, e.g., certain registers and L1 cache, available on the physical processing unit 102. Likewise, the physical processing unit 104 may require its first and second logical processing units 104A and 104B to share certain memory spaces, including, e.g., certain registers and L1 cache, available on the physical processing unit 104.

In some embodiments, the processor 100 may further include an instruction code storage 110. The instruction code storage 110 may store instruction code that can be executed by the processor 100. The instruction code, when executed by the processor 100, may cause the processor 100 to perform certain operations. The instruction code may be referred to as microcode in some implementations.

The processor 100 may execute a set of instruction code 112 to support requests for establishing and entering protected execution environments referred to as "enclaves." In some embodiments, the processor 100 may support requests for establishing and entering enclaves using extensions similar to that provided in Intel® SGX or the like. It is to be understood, however, that the utilization of Intel® SGX is merely presented as an example and is not meant to be limiting. It is contemplated that the processor 100 may support other types of extensions provided for establishing and entering protected execution environments, including hardware supported implementations of trusted execution environments (TEEs) and the like. Such extensions may allow instruction code, referred to as "microcode," to be built into the processor to support establishment of protected execution environments or enclaves. An application, including a user-level application, may utilize the instruction code to request for execution inside an enclave. Once an enclave is established, the processor 100 may provide hardware-enforced protection for the enclave, e.g., using cryptography, to ensure that contents stored in the enclave are protected and cannot be read or written by processes outside of that enclave.

The processor 100 may allow an application 118, e.g., a user-level application, to request for execution inside an enclave. If the application 118 is submitted to the processor 100 for execution with such a request, the processor 100 may accept the request and ensure that when the application 118 is loaded into one of the logical processing units 102A, 102B, 104A, or 104B for execution, that logical processing unit will enter into an enclave as requested by the application to protect the execution of the application 118. The processor 100 will also provide hardware-enforced protection for the enclave. For example, in some embodiments, the processor 100 will use cryptography to ensure that contents stored in the enclave are protected and cannot be read or written by applications executing outside of that enclave.

The processor 100 may provide additional protections for the application 118 by allowing the application 118 to declare whether it trusts any applications to execute with it on the same physical processing unit. If the application 118 makes such a declaration, then the processor 100 will only allow applications that are deemed "trusted" by the application 118 to execute with the application 118 on the same physical processing unit. For example, if the application 118 is loaded into the logical processing unit 102A for execution, then the processor 100 will only allow applications that are deemed trusted by the application 118 to be loaded into the logical processing unit 102B for execution with the application 118. In this manner, the processor 100 can prevent untrusted applications from executing with the application 118 on the same physical processing unit 102, effectively eliminating the possibility of letting untrusted applications gaining access to data stored by the application 118.

In some embodiments, the processor 100 may support the declaration of trusted applications and ensure that only trusted applications can execute on the same physical processing unit by, e.g., (1) providing a trust declaration interface 116 to support trust declarations, (2) requiring the physical processing units 102 and 104 to record enclave entry and exit status 128 and 130 of their respective logical processing units, and (3) enforcing a set of enclave entry and exit procedures defined in a set of enclave entry and exit control code 114. Each of these elements will be described in detail below.

For instance, in some embodiments, the processor 100 may support trust declarations by allowing the application 118, e.g., a user-level application, to utilize a section of its code to declare which applications it considers as trusted applications. The application 118 may be allowed to only trust itself, which means that no other application can execute on the same physical processing unit while the application 118 is executing, except for another instance of the application 118 itself. When the application 118 is submitted to the processor 100 for execution, the processor 100 may utilize a trust declaration interface 116 to parse the application 118 and determine if it contains any trust declarations. If so, the processor 100 may obtain the trust declarations and record the trust declarations on the processor 100 so they can be enforced during the execution of the application 118.

In some embodiments, the processor 100 may record the trust declarations obtained from the application 118 in a memory space that belongs to the physical processing unit on which the application 118 will execute. For example, if the processor 100 determines that the application 118 will execute on the logical processing unit 102A, the processor 100 may record the trust declarations declared by the application 118 in a memory space 120 that belongs to the physical processing unit 102. Similarly, if the processor 100 determines that the application 118 will execute on the logical processing unit 104A, the processor may record the trust declaration declared by the application 118 in a memory space 122 that belongs to the physical processing unit 104.

Figure 2:
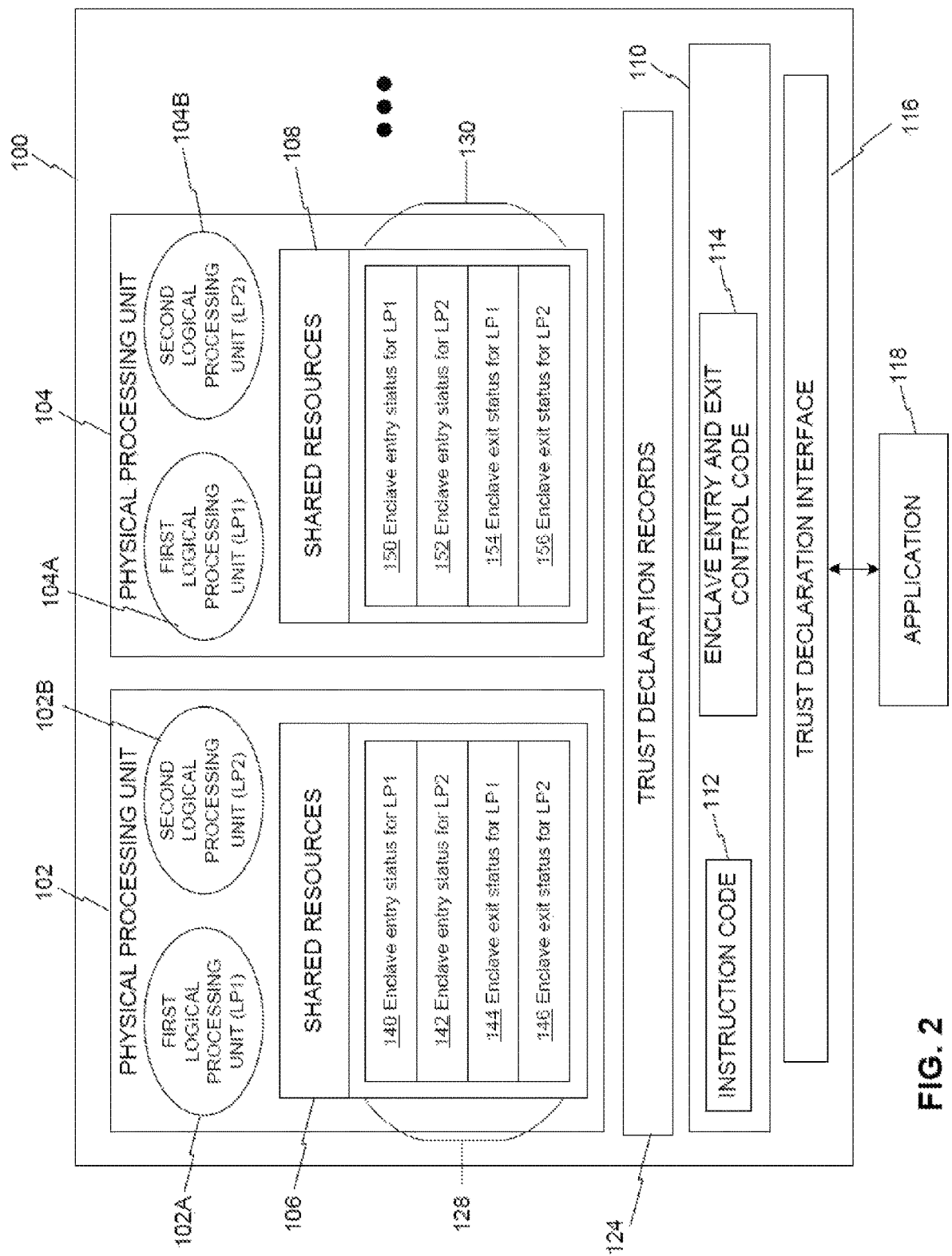
FIG. 2 is a schematic diagram of a processor, according to an embodiment.

In some embodiments, the processor 100 may record the trust declarations declared by the application 118 in a shared memory space that is accessible to all physical processing units contained in the processor 100. For example, as depicted in FIG. 2, the processor 100 may record the trust declarations obtained from the application 118 in a shared memory space 124 (FIG. 2) that is accessible to the physical processing units 102 and 104. In some embodiments, the processor 100 may also record the trust declarations in a trusted memory space outside of the processor 100. The processor 100 may record pointers locally and may utilize the recorded pointers to access the trust declarations recorded on the trusted memory space.

In some embodiments, the processor 100 may require the physical processing units 102 and 104 to record enclave entry and exit status records 128 and 130 of their respective logical processing units. The enclave entry and exit status records 128 and 130 may be recorded locally within the respective physical processing units 102 and 104. The physical processing units 102 and 104 may record enclave entry and exit status using any data format capable of indicating, e.g., whether any of their respective logical processing units is waiting to enter an enclave as requested by an application loaded therein, whether any of their respective logical processing units is currently operating inside an enclave, or whether any of their respective logical processing units is waiting to exit an enclave.

In some embodiments, each physical processing unit may provide an enclave entry status record and an enclave exit status record to each logical processing unit hosted on that physical processing unit. For instance, in the example depicted in FIG. 1, the physical processing unit 102 may provide an enclave entry status record 140 and an enclave exit status record 144 to the first logical processing unit 102A. The physical processing unit 102 may also provide an enclave entry status record 142 and an enclave exit status record 146 to the second logical processing unit 102B. Similarly, the physical processing unit 104 may provide enclave entry status records 150 and 154 and enclave exit status records 152 and 156 to its logical processing units 104A and 104B. Recording enclave entry status and enclave exit status in this manner may help facilitate enforcement of enclave entry and exit procedures to ensure that only trusted applications can execute on the same physical processing unit.

Figure 3:
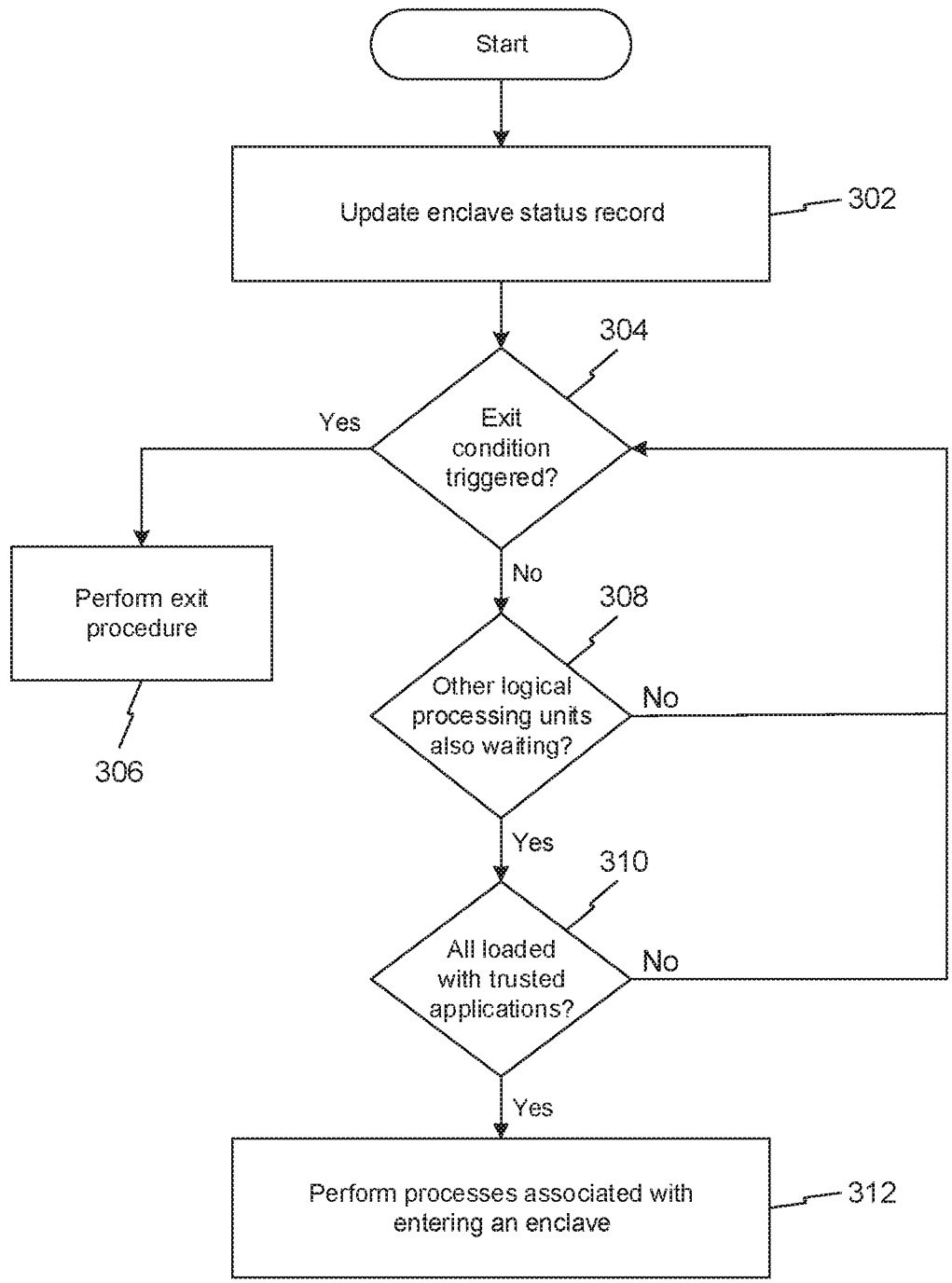
FIG. 3 is a flow chart of a method for entering an enclave, according an embodiment.

FIG. 3 illustrates a flow chart of a method 300 performed by each logical processing unit, e.g., the first logical processing unit 102A (FIGS. 1 and 2), for entering an enclave, according to an embodiment. The method 300 may be invoked when the first logical processing unit 102A is loaded with an application, e.g., the application 118, that requires execution inside an enclave. At step 302, the first logical processing unit 102A may clear its enclave exit status record 144 and update its enclave entry status record 140 to indicate that the first logical processing unit 102A is loaded with the application 118 waiting to enter an enclave.

At step 304, the first logical processing unit 102A may check whether an exit condition has been triggered. The exit condition may be triggered when an interruption or an exception has occurred on the processor 100. An interruption may occur, e.g., when an unexpected event from outside of the processor 100 disrupts the normal flow of execution on the processor 100. An exception may occur, e.g., when an unexpected event from within the processor 100 disrupts the normal flow of execution on the processor 100. The exit condition may also be triggered if the processor 100 has issued a termination command (e.g., in response to a command issued by a user through an operation system). If an exit condition has been triggered, the first logical processing unit 102A may proceed to step 306, where the first logical processing unit 102A is required to terminate its execution of the application 118 and perform an exit procedure. The details of this exit procedure will be described below in conjunction with FIG. 4.

If no exit condition has been triggered, the first logical processing unit 102A may proceed to step 308. At step 308, the first logical processing unit 102A may determine whether one or more other logical processing units hosted on the physical processing unit 102 are also waiting to enter their respective enclaves. In the example depicted in FIG. 1, there is only one other logical processing unit hosted on the physical processing unit 102, namely, the second logical processing unit 102B, so the first logical processing unit 102A may determine whether the second logical processing unit 102B is waiting to enter the enclave of the second logical processing unit 102B. The first logical processing unit 102A may make this determination by checking the enclave entry status record 142 of the second logical processing unit 102B. If the enclave entry status record 142 of the second logical processing unit 102B does not indicate that the second logical processing unit 102B is loaded with an application waiting to enter an enclave, the first logical processing unit 102A may repeat step 304. In this manner, the first logical processing unit 102A is prevented from enter an enclave unless the second logical processing unit 102B is also waiting and ready to enter an enclave along with the first logical processing unit 102A.

In some embodiments, the first logical processing unit 102A may implement a timeout mechanism to avoid having to wait indefinitely. In this manner, the first logical processing unit 102A may continue to repeat step 304 until a timeout limit is reached. If the enclave entry status record 142 of the second logical processing unit 102B still does not indicate that the second logical processing unit 102B is loaded with an application waiting to enter an enclave at the end of the time out limit, the first logical processing unit 102A may terminate its execution of the application 118 and perform the exit procedure described below in conjunction with FIG. 4.

If the second logical processing unit 102B is waiting and ready to enter an enclave along with the first logical processing unit 102A (e.g., if the enclave entry status record 142 of the second logical processing unit 102B indicates that the second logical processing unit 102B is loaded with an application waiting to enter an enclave), then the first logical processing unit 102A may proceed to step 310. At step 310, the first logical processing unit 102A may determine whether the application loaded in the second logical processing unit 102B is trusted by the application 118 loaded in the first logical processing unit 102A. The first logical processing unit 102A may make this determination by checking the trust declarations stored in the memory space 120 (FIG. 1) or the share memory space 124 (FIG. 2), depending on the implementation. If the application loaded in the second logical processing unit 102B is not trusted by the application 118, the first logical processing unit 102A may repeat step 304 again. In this manner, the first logical processing unit 102A may only be allowed to enter an enclave if the second logical processing unit 102B is loaded with an application and that application has been declared as "trusted" by the application 118.

If the second logical processing unit 102B is loaded with an application and that application has been declared as "trusted" by the application 118, then the first logical processing unit 102A may proceed to step 312. At step 312, the first logical processing unit 102A may carry out processes associated with entering an enclave. These processes may be carried out in manners similar to that provided by Intel® SGX and the like. The first logical processing unit 102A may then update its enclave entry status record 140 to indicate that it is no longer waiting to enter an enclave. The first logical processing unit 102A may now carry out the instructions specified in the application 118.

It is to be understood that while the method 300 is described as being performed by the first logical processing unit 102A, the method 300 may be performed by the second logical processing unit 102B in the same manner. This can ensure that only trusted applications execute on the same physical processing unit 102.

It is also to be understood that the method 300 may not allow the first logical processing unit 102A (or any logical processing unit) to enter an enclave by itself. In other words, the first logical processing unit 102A may need to wait till the second logical processing unit 102B is loaded with an application waiting to enter an enclave and that application is deemed to be trusted by the application 118. If the application 118 does not trust any other applications, then the second logical processing unit 102B may load a second instance of the application 118. Because an application is generally deemed to be trusted by itself, the requirement by the method 300 can be satisfied. The method 300 also allows the application 118 to be developed as a multi-threaded application to take advantage of this requirement.

Figure 4:
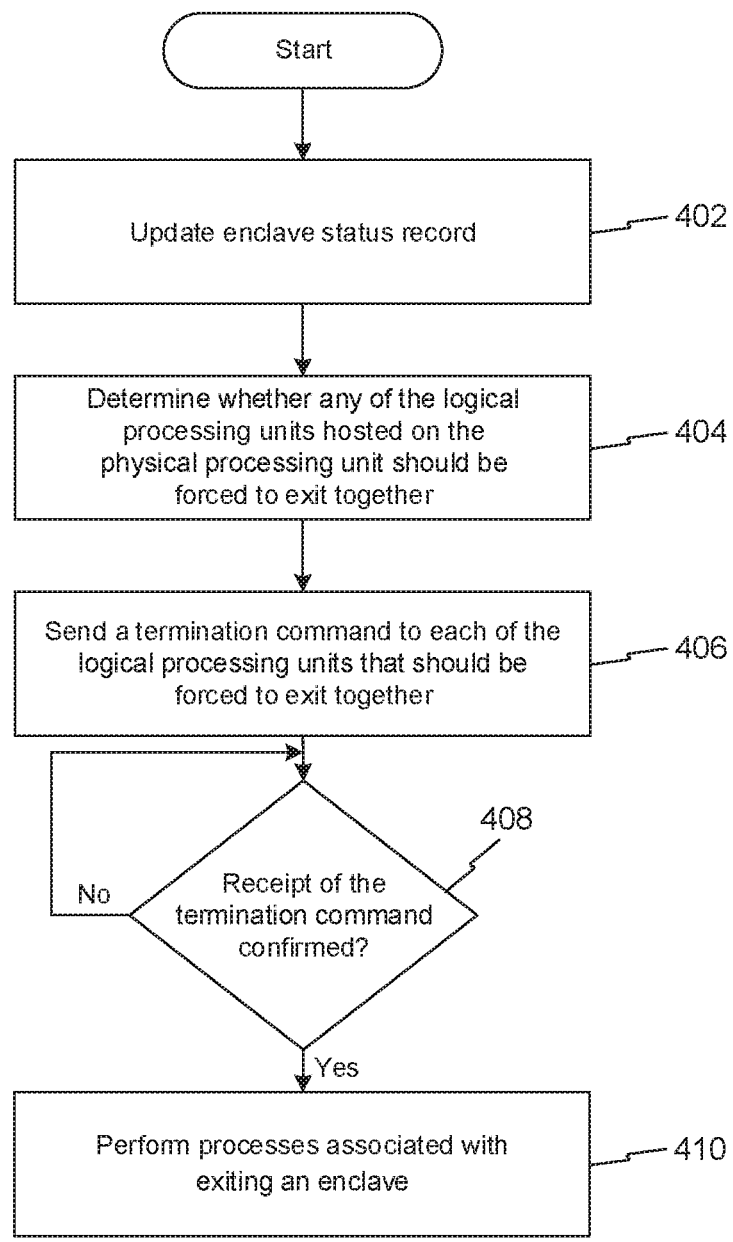
FIG. 4 is a flow chart of a method for exiting an enclave, according an embodiment.

FIG. 4 illustrates a flow chart of a method 400 performed by each logical processing unit, e.g., the first logical processing unit 102A, for exiting an enclave, according to an embodiment. The first logical processing unit 102A may exit the enclave after completing the instructions specified in the application 118, or after encountering an exit condition. The exit condition may be triggered when an interruption or an exception has occurred on the processor 100. The exit condition may also be triggered if the processor 100 or another logical processing unit executing on the physical processing unit 102 issue a termination command.

At step 402, the first logical processing unit 102A may clear its enclave entry status record 140 and update its enclave exit status record 144 to indicate that the first logical processing unit 102A is now waiting to exit the enclave.

At step 404, the first logical processing unit 102A may determine whether any of the logical processing units hosted on the physical processing unit 102 should be forced to exit together with the first logical processing unit 102A. In some embodiments, the first logical processing unit 102A may carry out the step 404 by checking the enclave entry status records of the other logical processing units hosted on the physical processing unit 102 and determine whether they are waiting to enter their respective enclaves, and if so, whether they are loaded with applications that are declared as trusted by the application 118. The first logical processing unit 102A may force these logical processing units to exit together with the first logical processing unit 102A to prevent the possibility of an intruder gaining access to the first logical processing unit 102A after the first logical processing unit 102A unloads the application 118. Allowing the intruder to gain access to the first logical processing unit 102A after the first logical processing unit 102A unloads the application 118 may be dangerous because it provides the intruder an opportunity to attack the applications trusted by the application 118 that are still executing on other logical processing units hosted on the physical processing unit 102.

In the example depicted in FIG. 1, there is only one other logical processing unit hosted on the same physical processing unit 102, namely, the second logical processing unit 102B, so the first logical processing unit 102A may carry out the step 404 by determining whether the second logical processing unit 102B is waiting to enter its enclave, and if so, whether the second logical processing unit 102B is loaded with an application that is declared as trusted by the application 118. If the second logical processing unit 102B is waiting to enter its enclave and is loaded with an application that is declared as trusted by the application 118, then the first logical processing unit 102A may determine that the second logical processing unit 102B should be forced to exit together with the first logical processing unit 102A.

At step 406, the first logical processing unit 102A may send a termination command to each of the logical processing units that the first logical processing unit 102A determined should be forced to exit. At step 408, the first logical processing unit 102A may confirm whether the logical processing units that the first logical processing unit 102A determined should be forced to exit have received the termination command. In some embodiments, the first logical processing unit 102A may carry out the step 408 by confirming whether or not the enclave entry status record for each of these logical processing units has been cleared. If the enclave entry status record for a particular logical processing unit has been cleared, the first logical processing unit 102A may consider that particular logical processing unit as having received the termination command. The first logical processing unit 102A may also carry out the step 408 by confirming whether or not the enclave exit status record for each of these logical processing units has been updated. If the enclave exit status record for a particular logical processing unit has been updated to indicate that the particular logical processing unit is waiting to exit, the first logical processing unit 102A may consider that particular logical processing unit as having received the termination command.

In some embodiments, the first logical processing unit 102A may repeat the step 408 until it confirms that all logical processing units that the first logical processing unit 102A has determined should be forced to exit have received the termination command. Once confirmed, the first logical processing unit 102A may proceed to step 410 and carry out the remaining processes associated with exiting an enclave, which may be carried out in manners similar to that provided by Intel® SGX and the like.

In some embodiments, the first logical processing unit 102A may entrust the processor 100 to clean data contained in the enclave as a part of the exit process. In some embodiments, the first logical processing unit 102A may carry out explicit operations to remove the data contained in the enclave prior to exiting the enclave to provide added security. In some embodiments, the first logical processing unit 102A may update its enclave exit status record 144 to indicate that it is no longer waiting to exit.

It is to be understood that the enclave entry and exit status records depicted in the examples above are merely examples and are not meant to be limiting. In some embodiments, the processor 100 may require the logical processing units to report their enclave entry status, but may make the reporting of enclave exit status optional. The processor 100 may, for example, rely solely on the enclave entry status to determine whether any logical processing unit is waiting to enter an enclave, currently operating inside an enclave, or waiting to exit an enclave. The processor 100 may allow the logical processing units to clear their enclave entry status to indicate that they are not operating inside an enclave and they are not waiting to enter an enclave, which may imply that a logical processing unit is waiting to exit an enclave.

It is also to be understood that while the method 400 is described as being performed by the first logical processing unit 102A, the method 400 may be performed by the second logical processing unit 102B in the same manner. This will ensure that only trusted applications can execute on the same the same physical processing unit 102, and if one application exits its enclave and terminates its execution for any reason, all of its trusted applications may also exit their respective enclaves and terminate their executions as well. The following examples will further illustrate the operations of the methods 300 and 400.

For example, suppose there are three applications, Application A, Application B, and Application C. Applications A and B trust each other, but neither Application A nor Application B trusts Application C. Further suppose that a processor, e.g., the processor 100, will assign the first logical processing unit 102A to process Application A and the second logical processing unit 102B to process Application B. At time T0, the first logical processing unit 102A may invoke the method 300 and load Application A. The first logical processing unit 102A may then loop between the steps 304 and 308 until the second logical processing unit 102B also invokes the method 300 and load Application B, or until a timeout limit is reached, which ever happens first.

In one scenario, suppose that the second logical processing unit 102B invokes the method 300 and loads Application B at time T1 before the timeout limit. The second logical processing unit 102B may therefore be able to determine that the first logical processing unit 102A has already been loaded with Application A and Application A is declared as trusted by Application B. The second logical processing unit 102B may thus proceed through the steps of the method 300 and enter its enclave. The first logical processing unit 102A may also be able to determine, after T1, that the second logical processing unit 102B has been loaded with Application B and Application B is declared as trusted by Application A, so the first logical processing unit 102A may also proceed through the rest of the steps of the method 300 and enter its enclave. Both the first and second logical processing units 102A and 102B may then carry out the instructions specified in their respective Applications A and B in their respective enclaves.

In another scenario, suppose that the second logical processing unit 102B is unable to load Application B before the timeout limit is reached, then the first logical processing unit 102A may invoke the method 400 to perform an exit procedure after the timeout limit. The first logical processing unit 102A may determine that because none of the logical processing units hosted on the physical processing unit 102 is waiting to enter any enclaves, the first logical processing unit 102A does not need to force any logical processing unit hosted on the physical processing unit 102 to exit together with the first logical processing unit 102A. The first logical processing unit 102A may therefore proceed to the step 410 of the method 400 and carry out the remaining exit procedures.

In yet another scenario, suppose that the second logical processing unit 102B invokes the method 300 and loads Application C at time T1 before the timeout limit. The second logical processing unit 102B may then determine that the first logical processing unit 102A has already been loaded with Application A, but Application A is not trusted by Application C. The second logical processing unit 102B may therefore be forced to loop between the steps 304 and 308 until the first logical processing unit 102A loads an application that has been declared as trusted by Application C, or until a timeout limit is reached, which ever happens first. The first logical processing unit 102A may be able to determine, after T1, that the second logical processing unit 102B has been loaded with Application C, but Application C is not trusted by Application A, so the first logical processing unit 102A may also be forced to continue the loop between the steps 304 and 308 until the second logical processing unit 102B loads an application that has been declared as trusted by Application A, or until a timeout limit is reached, which ever happens first. In this scenario, one (or both) of the first and second logical processing units 102A and 102B may timeout eventually, and that logical processing unit may invoke the method 300 again and load a different application.

In still another scenario, suppose the first logical processing unit 102A is loaded with Application A and the second logical processing unit 102B is loaded with Application B, and both the first and second logical processing units 102A and 102B have entered their respective enclaves to carry out their respective executions. Further suppose that the first logical processing unit 102A received a termination command. This termination command may be issued by the processor 100 or may be generated due to a fault or interruption that has occurred on the processor 100. Regardless of the source of the termination command, the first logical processing unit 102A may invoke the method 400 upon receiving the termination command. Once the method 400 is invoked, the first logical processing unit 102A may clear its enclave entry status record and update its enclave exit status record to indicate that it is waiting to exit the enclave. The first logical processing unit 102A may also determine that the second logical processing unit 102B should be forced to exit together with the first logical processing unit 102A. The first logical processing unit 102A may send a termination command to the second logical processing unit 102B, which may also invoke the method 400. The second logical processing unit 102B may clear its enclave entry status record and update its enclave exit status record to indicate that it is waiting to exit the enclave. The second logical processing unit 102B may determine that there is no need to force the first logical processing unit 102A to exit because the first logical processing unit 102A has already cleared its enclave entry status record. Both the first and second logical processing units 102A and 102B may then proceed to exit their enclaves.

In still another scenario, suppose the first logical processing unit 102A is loaded with Application A and the second logical processing unit 102B is loaded with Application B, and both the first and second logical processing units 102A and 102B have entered their respective enclaves to carry out their respective executions. Further suppose that the first and second logical processing units 102A and 102B both received a termination command. This termination command may be issued by the processor 100 or may be generated due to a fault or interruption that has occurred on the processor 100. Regardless of the source of the termination command, both the first and second logical processing units 102A and 102 B may invoke the method 400 upon receiving the termination command. Once the method 400 is invoked, both the first and second logical processing units 102A and 102B may clear their enclave entry status records and update their enclave exit status records to indicate that they are waiting to exit their respective enclaves. Both the first and second logical processing units 102A and 102B may determine that they both should be forced to exit together. Both the first and second logical processing units 102A and 102B may therefore send a termination command to each other. Because both the first and second logical processing units 102A and 102B are already in the process of performing the method 400, they may simply continue to carry out the steps specified in the method 400. Also, because both the first and second logical processing units 102A and 102B have already cleared their enclave entry status records, both the first and second logical processing units 102A and 102B will consider each other as having received the termination command. Both the first and second logical processing units 102A and 102B may then proceed to exit their respective enclaves.

Figure 5:
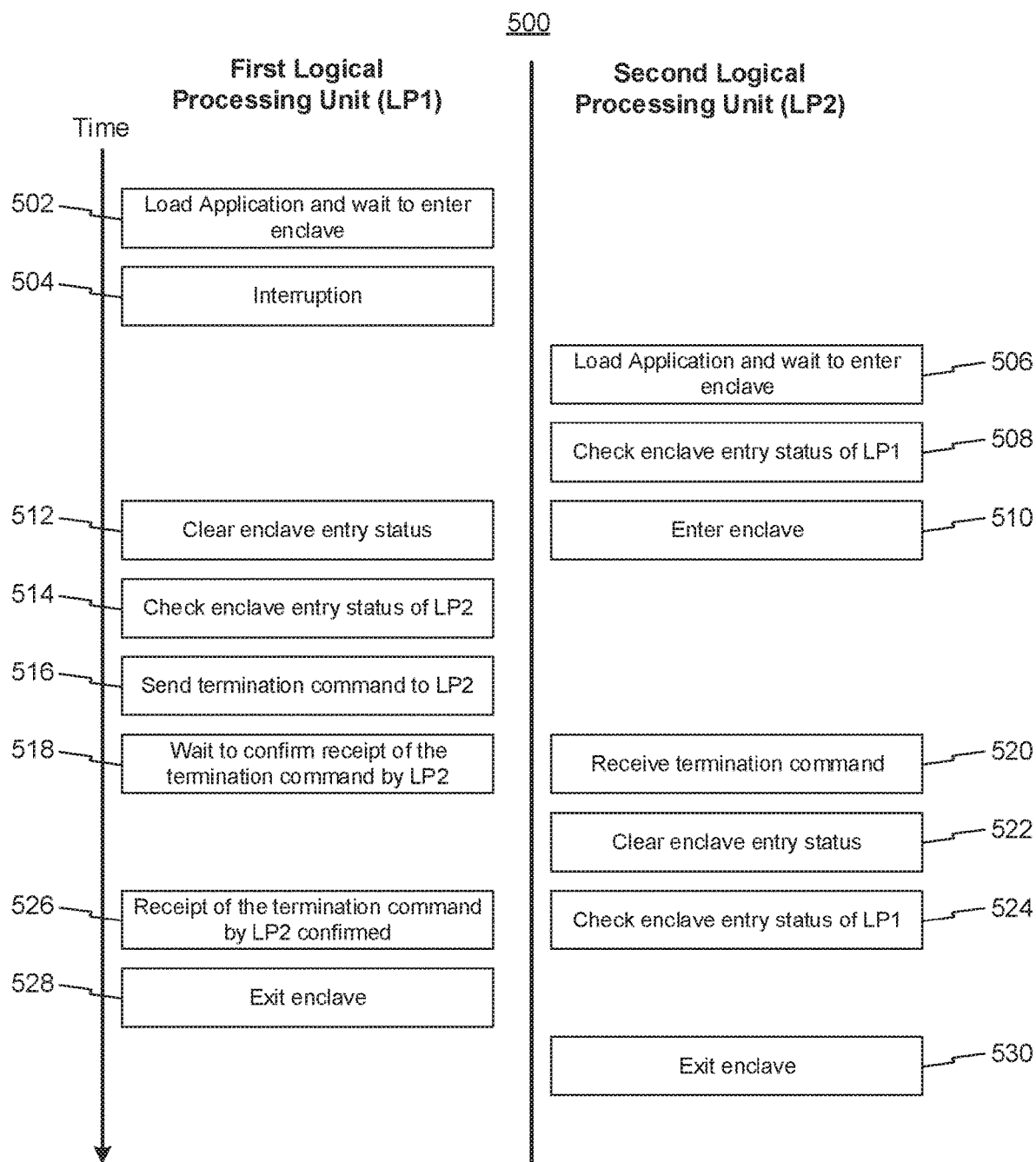
FIG. 5 is a schematic diagram of a scenario where an interruption occurs when two logical processing units are attempting to enter enclaves, according an embodiment.

The methods 300 and 400 described above can also handle more complex scenarios when interruptions occur on the processor 100. FIG. 5 is a schematic diagram of a scenario 500 where an interruption occurs after the first logical processing unit 102A has invoked the method 300 to load Application A.

At time instance 502, the first logical processing unit 102A invokes the method 300 (FIG. 3) and loads Application A. At time instance 504, an interruption occurs, which triggers an exit condition that will force the first logical processing unit 102A to proceed to step 306 and invoke the method 400 (FIG. 4). However, before the first logical processing unit 102A is able to invoke the method 400, which will happen at time instance 512, the second logical processing unit 102B may have already invoked the method 300 and loaded Application B at time instance 506. The second logical processing unit 102B may have also determined at time instance 508, based on the records made available to the second logical processing unit 102B, that the first logical processing unit 102A is loaded with Application A and Application A is trusted by Application B. Accordingly, the second logical processing unit 102B may have already proceed through the steps of the method 300 and entered its enclave at time instance 510.

In this scenario, the first logical processing unit 102A may continue to carry out the steps of the method 400. The first logical processing unit 102A may clear its enclave entry status record at time instance 512 (step 402) and determine whether the second logical processing unit 102B should be forced to exit together with the first logical processing unit 102A at time instance 514 (step 404). The first logical processing unit 102A may determine that the second logical processing unit 102B should be forced to exit together with the first logical processing unit 102A, so the first logical processing unit 102A may send a termination command to the second logical processing unit 102B at time instance 516 (step 406). The first logical processing unit 102A may wait to confirm whether the second logical processing unit 102B has received the termination command at time instance 518 (step 408). The second logical processing unit 102B may receive the termination command at time instance 520, which is substantially the same as time instance 516. The second logical processing unit 102B may then invoke the method 400 and clear its enclave entry status record at time instance 522. The second logical processing unit 102B may realize, at time instance 524, that it does not need to force the first logical processing unit 102A to exit because the first logical processing unit 102A has already indicated that it was exiting (the first logical processing unit 102A has already cleared its enclave entry status record). The first logical processing unit 102A may be able to confirm, at time instance 526, that the second logical processing unit 102B has received the termination command and has indicated that it is exiting (the second logical processing unit 102B has now cleared its enclave entry status record). Both the first and second logical processing units 102A and 102B may then proceed to exit their enclaves at time instances 528 and 530, respectively.

Figure 6:
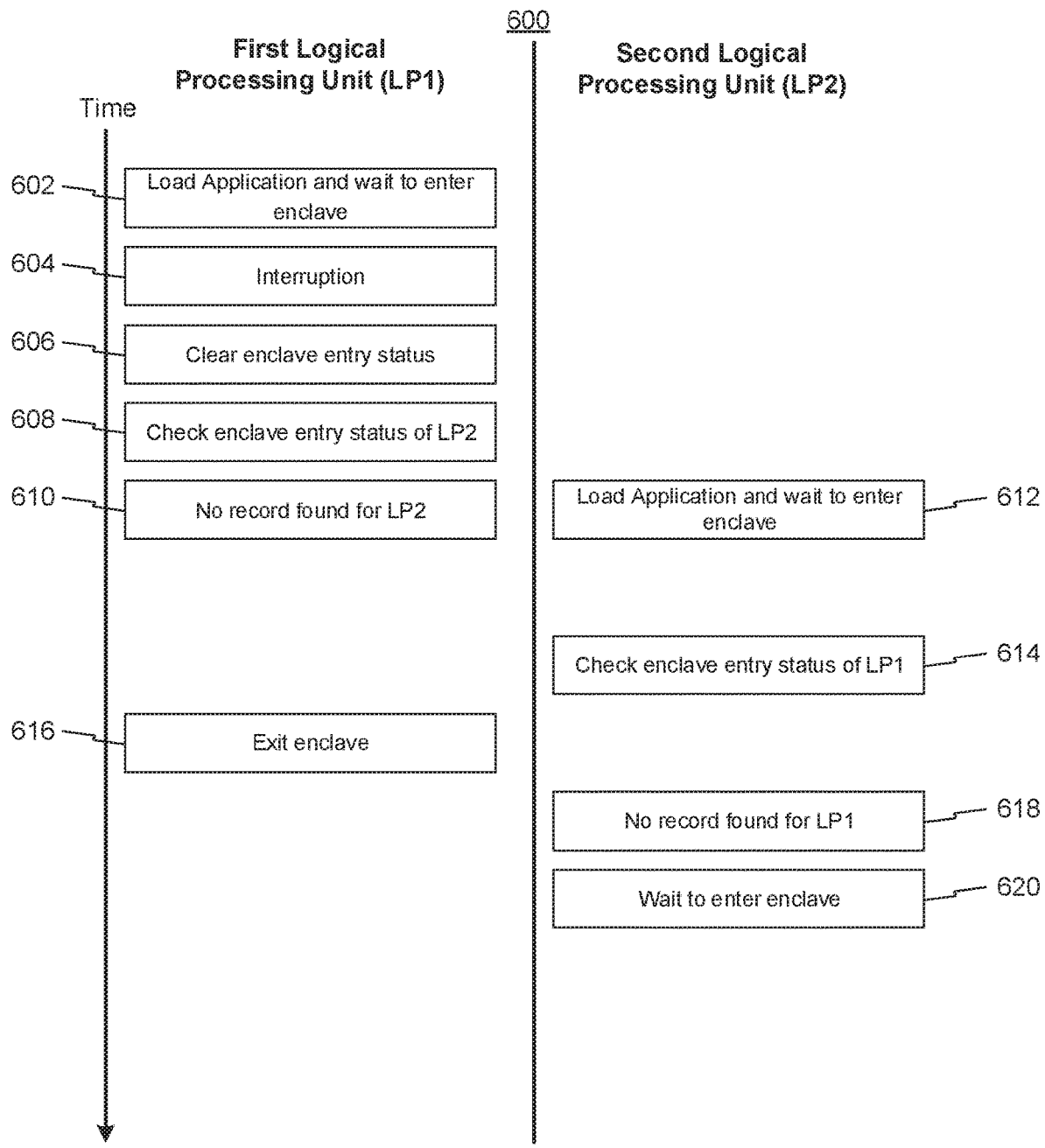
FIG. 6 is a schematic diagram of another scenario where an interruption occurs when two logical processing units are attempting to enter enclaves, according an embodiment.

FIG. 6 is a schematic diagram of another scenario 600 where an interruption has occurred after the first logical processing unit 102A has invoked the method 300 to load Application A, according to an embodiment.

At time instance 602, the first logical processing unit 102A invokes the method 300 (FIG. 3) and loads Application A. At time instance 604, an interruption occurs, which triggers an exit condition that will force the first logical processing unit 102A to proceed to step 306 and invoke the method 400 (FIG. 4). At time instance 606, the first logical processing unit 102A clears its enclave entry status record (step 402). At time instance 608, the first logical processing unit 102 determines whether the second logical processing unit 102B should be forced to exit together with the first logical processing unit 102A (step 404). In this scenario, the first logical processing unit 102A may determine, at time instance 610, that there is no need to force the second logical processing unit 102B to exit because the second logical processing unit 102B has not loaded any applications yet. The first logical processing unit 102A may proceed to exit at time instance 616.

If the second logical processing unit 102B invokes the method 300 at time instance 612, then the second logical processing unit 102B may proceed to determine the status of the first logical processing unit 102A at time instance 614. The second logical processing unit 102B may determine, at time instance 618, that the first logical processing unit 102A is not loaded with any applications and is not waiting to enter an enclave (the first logical processing unit 102A has already cleared its enclave entry status record at time instance 606). The second logical processing unit 102B may therefore be forced to wait at time instance 620, eliminating the possibility of the second logical processing unit 102B gaining entrance to an enclave alone. In this manner, by executing the methods 300 and 400 described above, the processor 100 can ensure that only trusted applications execute on the same physical processing unit, effectively eliminating the possibility of an intruder gaining access to an application's protected execution environment without having to disable its multithreading capabilities.

Figure 7:
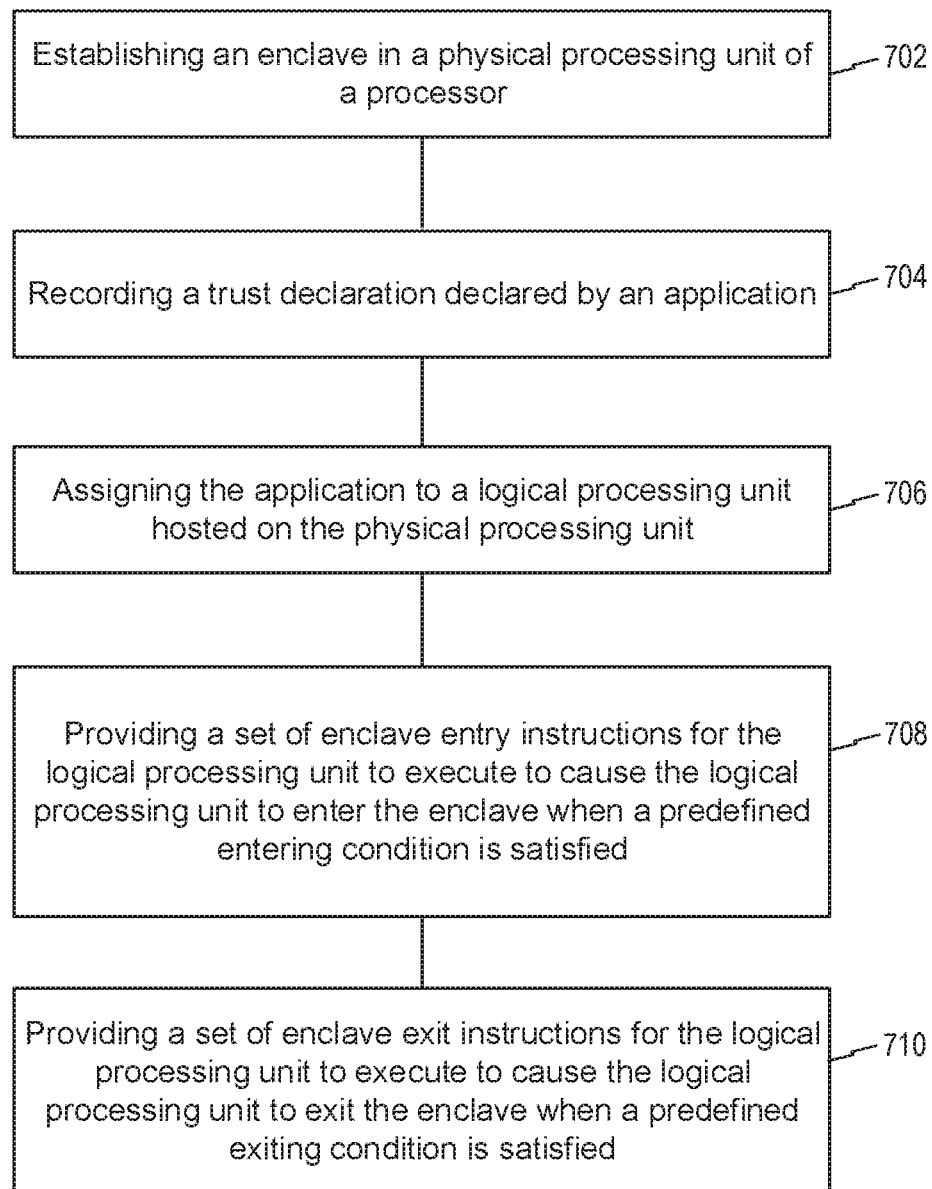
FIG. 7 is a flow chart of a method for executing applications, according to an embodiment.

FIG. 7 illustrates a flow chart of a method 700 for executing applications according to an embodiment. The method 700 may be performed by a processor, e.g., the processor 100 (FIG. 1).

At step 702, the processor may establish one or more enclaves in one or more physical processing units of the processor. At step 704, the processor may record a first trust declaration declared by a first application. The first trust declaration may declare whether the first application trusts any application(s) to execute with the first application on the same physical processing unit. The first application may declare that it only trusts itself, or may declare that it trusts a list of applications.

In some embodiments, the processor 100 may provide an interface, e.g., the interface 116 (FIG. 1), to obtain the first trust declaration declared by the first application. The processor 100 may also obtain and record trust declarations declared by other applications in the same manner.

In some embodiments, the processor 100 may record the first trust declaration in a memory space of a physical processing unit that will handle the execution of the first application. The processor 100 may also record the first trust declaration in a memory space shared by all physical processing units of the processor 100. In some embodiments, the processor 100 may also record the first trust declaration in a memory space located outside of the processor 100. The processor 100 may record pointers locally and may utilize the recorded pointers to access the trust declarations recorded in the memory space located outside of the processor 100.

At step 706, the processor 100 may assign the first application to a first logical processing unit hosted on a first physical processing unit of the processor. For example, with reference to FIG. 1, the processor 100 may assign the first application to the first logical processing unit 102A hosted on the first physical processing unit 102 of the processor 100.

At step 708, the processor 100 may provide a set of enclave entry instructions for the first logical processing unit 102A to execute, to cause the first logical processing unit 102A to enter the enclave when a predefined entering condition is satisfied. In some embodiments, the predefined entering condition may be satisfied when all logical processing units hosted on the first physical processing unit 102 are loaded with applications and all loaded applications are declared as trusted by the first application. In some embodiments, the processor 100 may provide a set of enclave entry instructions that includes the steps of the method 300 (FIG. 3) for the first logical processing unit 102A to execute to ensure that the first logical processing unit 102A will enter the enclave only when a predefined entering condition is satisfied.

At step 710, the processor 100 may provide a set of enclave exit instructions for the first logical processing unit 102A to execute, to cause the first logical processing unit 102A to exit the enclave when a predefined exiting condition is satisfied. In some embodiments, the predefined exiting condition may be satisfied when all logical processing units hosted on the first physical processing unit 102 that have been loaded with applications declared as trusted by the first application have started executing the set of enclave exit instructions. In some embodiments, the processor 100 provide a set of enclave exit instructions that includes the steps of the method 400 (FIG. 4) for the first logical processing unit 102A to execute to ensure that the first logical processing unit 102A will exit the enclave only when a predefined exiting condition is satisfied.

Figure 8:
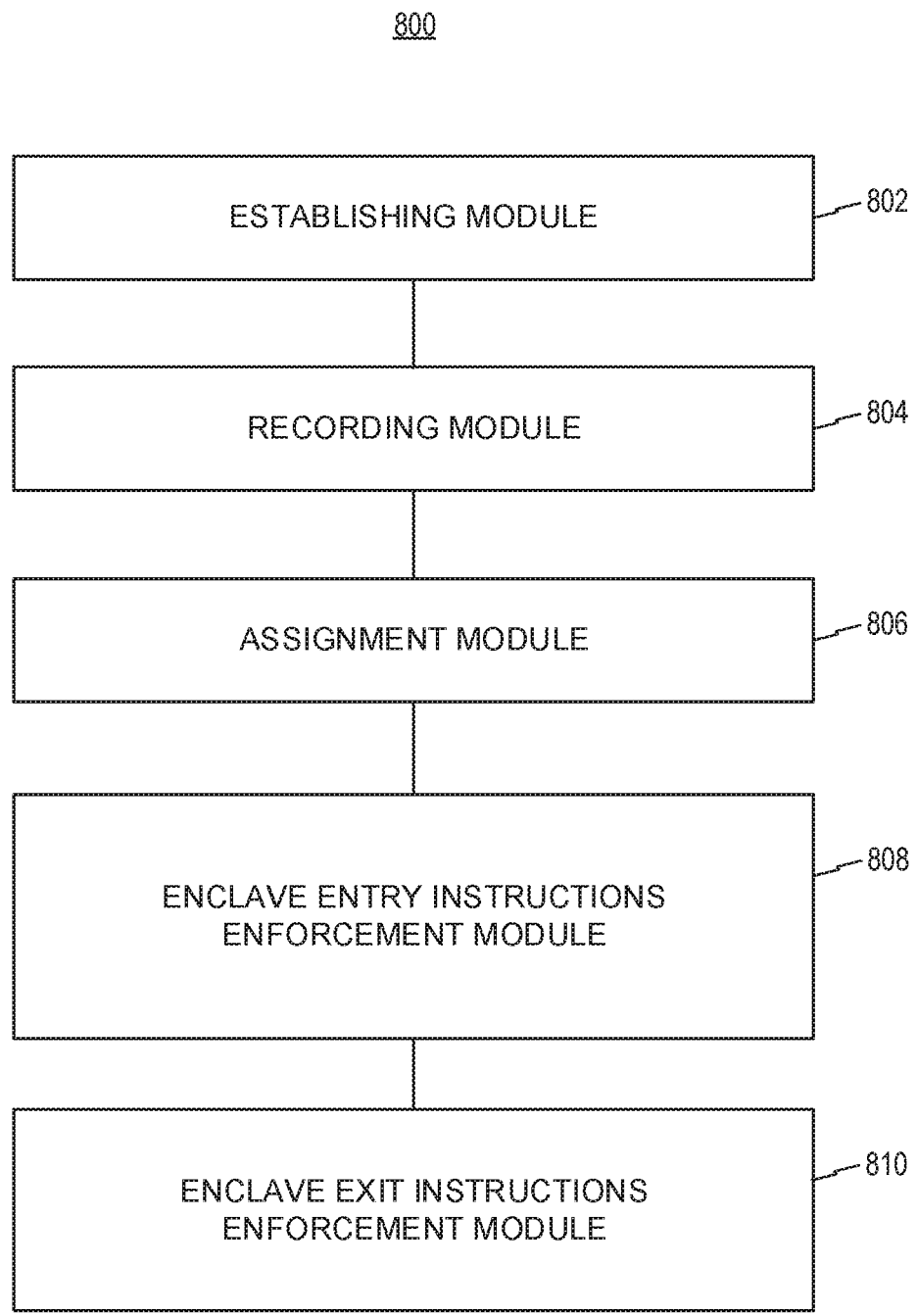
FIG. 8 is a block diagram of an apparatus for executing applications, according to an embodiment.

FIG. 8 is a block diagram of an apparatus 800 for executing applications according to an embodiment. For example, the apparatus 800 may be an implementation of a control process provided on a processor, and may correspond to the method 700 (FIG. 7). Referring to FIG. 8, the apparatus 800 may include an establishing module 802, a recording module 804, an assignment module 806, an enclave entry instructions enforcement module 808, and an enclave exit instructions enforcement module 810.

The establishing module 802 may establish one or more enclaves in one or more physical processing units of the processor. The recording module 804 may record trust declarations declared by applications. The assignment module 806 may assign applications to logical processing units hosted on physical processing units of the processor for execution.

The enclave entry instructions enforcement module 808 may provide a set of enclave entry instructions for the logical processing units to execute to ensure that the logical processing units will enter their respective enclaves only when a predefined entering condition is satisfied. In some embodiments, the enclave entry instructions enforcement module 808 may provide a set of enclave entry instructions that includes the steps of the method 300 (FIG. 3) for the logical processing units to execute.

The enclave exit instructions enforcement module 810 may provide a set of enclave exit instructions for the logical processing units to execute to ensure that the logical processing units will exit their respective enclaves only when a predefined exiting condition is satisfied. In some embodiments, the enclave exit instructions enforcement module 810 may provide a set of enclave exit instructions that includes the steps of the method 400 (FIG. 4) for the logical processing units to execute.

Each of the above described modules may be implemented as software, or hardware, or a combination of software and hardware. For example, each of the above described modules may be implemented using a processor executing instructions stored in a memory. Also, for example, each the above described modules may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the described methods. Further for example, each of the above described modules may be implemented by using a computer chip or an entity, or implemented by using a product having a certain function. In one embodiment, the apparatus 800 may be a computer, and the computer may be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each module in the apparatus 800, references can be made to corresponding steps in the above-described methods. Details are omitted here for simplicity.

Figure 9:
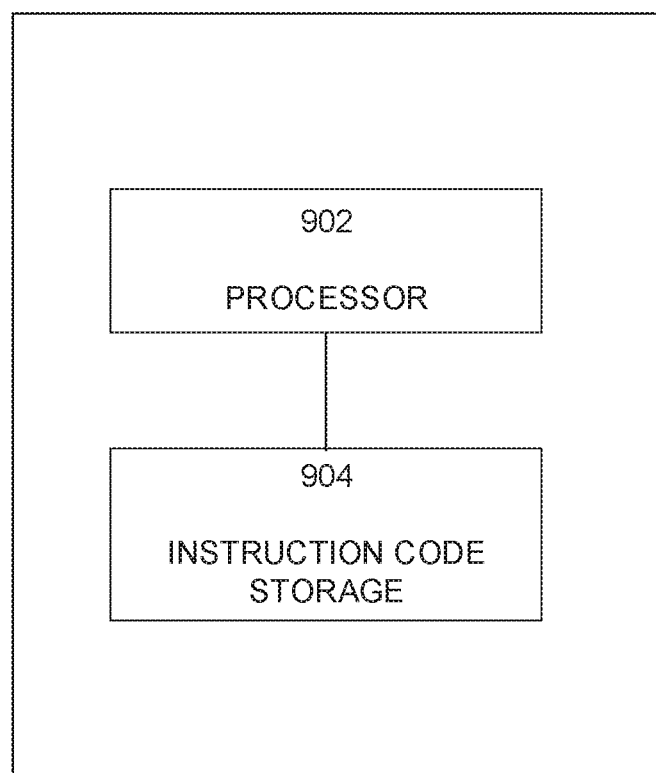
FIG. 9 is a block diagram of a device for executing applications, according to an embodiment.

FIG. 9 is a block diagram of a device 900 for executing applications according to an embodiment. For example, the device 900 may include a processor 902 that further includes one or more physical processing units, and a computer-readable instruction code storage 904 coupled to the one or more physical processing units and having instructions stored thereon that are executable by the one or more physical processing units to perform the above described methods. For example, the processor 902 may be the processor 100 illustrated in FIGS. 1 and 2, and the computer-readable instruction code storage 904 may be a memory space of a physical processing unit of the processor 902, a memory space shared by all physical processing units of the processor 902, or a memory space located outside of the processor 902. Also for example, the device 900 may operate as a node of a blockchain system, or communicate with a node of a blockchain system if it does not operate as a node.

In some embodiments, a computer program product may include a non-transitory computer-readable storage medium having computer-readable program instructions thereon for causing a processor to carry out the above-described methods.

The computer-readable storage medium may be a tangible device that can store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. The computer-readable storage medium may be a built-in component packaged into a processor.

The computer-readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object oriented programming language, and conventional procedural programming languages. The computer-readable program instructions may execute entirely on a computing device as a stand-alone software package, or partly on a first computing device and partly on a second computing device remote from the first computing device.

The computer-readable program instructions may be provided to a processor of a general-purpose or special-purpose computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

Although the specification has been described in conjunction with specific embodiments, many alternatives, modifications and variations will be apparent to those skilled in the art. Accordingly, the following claims embrace all such alternatives, modifications and variations that fall within the terms of the claims.

What is claimed is:

1. A computer-implemented method for executing applications, the method comprising:
    assigning a first application to a first logical processing unit hosted on a first physical processing unit of a processor;
    providing a set of enclave entry instructions for the first logical processing unit to execute, to cause the first logical processing unit to enter an enclave when a predefined entering condition is satisfied, wherein the predefined entering condition is satisfied when all logical processing units hosted on the first physical processing unit are loaded with applications and all loaded applications are declared as trusted by the first application; and
    providing a set of enclave exit instructions for the first logical processing unit to execute, to cause the first logical processing unit to exit the enclave when a predefined exiting condition is satisfied.

2. The method of claim 1, wherein the set of enclave entry instructions instructs the first logical processing unit to determine whether the predefined entering condition is satisfied by performing steps comprising:
    updating an entry status record to indicate that the first logical processing unit is loaded with the first application and is waiting to enter the enclave;
    determining whether all logical processing units hosted on the first physical processing unit are loaded with applications; and
    in response to a determination that not all logical processing units hosted on the first physical processing unit are loaded with applications, repeating the determination of whether all logical processing units hosted on the first physical processing unit are loaded with applications.

3. The method of claim 2, wherein the set of enclave entry instructions instructs the first logical processing unit to determine whether the predefined entering condition is satisfied by performing steps further comprising:
    in response to a determination that all logical processing units hosted on the first physical processing unit are loaded with applications, determining whether all loaded applications are declared as trusted by the first application based on a first trust declaration by the first application, the first trust declaration declaring whether the first application trusts any application to execute with the first application on the first physical processing unit; and
    in response to a determination that not all loaded applications are declared as trusted by the first application, repeating the determination of whether all loaded applications are declared as trusted by the first application.

4. The method of claim 3, wherein the set of enclave entry instructions instructs the first logical processing unit to determine whether the predefined entering condition is satisfied by performing steps further comprising:
    in response to a determination that all loaded applications are declared as trusted by the first application based on the first trust declaration, carrying out processes associated with entering the enclave.

5. The method of claim 1, wherein the set of enclave entry instructions instructs the first logical processing unit to determine whether the predefined entering condition is satisfied by performing steps further comprising:
    determining whether a timeout limit is reached; and
    in response to a determination that the timeout limit is reached, executing the set of enclave exit instructions.

6. The method of claim 1, wherein the set of enclave entry instructions instructs the first logical processing unit to determine whether the predefined entering condition is satisfied by performing steps further comprising:
    determining whether an exit condition is triggered; and
    in response to a determination that the exit condition is reached, executing the set of enclave exit instructions.

7. The method of claim 1, wherein the predefined exiting condition is satisfied when all logical processing units hosted on the first physical processing unit that have been loaded with applications declared as trusted by the first application have started executing the set of enclave exit instructions.

8. The method of claim 1, wherein the set of enclave exit instructions instructs the first logical processing unit to determine whether the predefined exiting condition is satisfied by performing steps comprising:
    updating an exit status record to indicate that the first logical processing unit is loaded with the first application and is waiting to exit the enclave; and
    determining whether there is at least one other logical processing unit hosted on the first physical processing unit that has been loaded with an application declared as trusted by the first application based on a first trust declaration by the first application, the first trust declaration declaring whether the first application trusts any application to execute with the first application on the first physical processing unit.

9. The method of claim 8, wherein the set of enclave exit instructions instructs the first logical processing unit to determine whether the predefined exiting condition is satisfied by performing steps further comprising:
    in response to a determination that there is at least one other logical processing unit hosted on the first physical processing unit that has been loaded with an application declared as trusted by the first application based on the first trust declaration, sending a termination command to each of the at least one other logical processing unit requesting the at least one other logical processing unit to execute the set of enclave exit instructions.

10. The method of claim 9, wherein the set of enclave exit instructions instructs the first logical processing unit to determine whether the predefined exiting condition is satisfied by performing steps further comprising:
  determining whether each of the at least one other logical processing unit has started executing the set of enclave exit instructions; and
  in response to a determination that not each of the at least one other logical processing unit has started executing the set of enclave exit instructions, repeating the determination of whether the at least one other logical processing unit has started executing the set of enclave exit instructions.

11. The method of claim 10, wherein the set of enclave exit instructions instructs the first logical processing unit to determine whether the predefined exiting condition is satisfied by performing steps further comprising:
  in response to a determination that each of the at least one other logical processing unit has started executing the set of enclave exit instructions, carrying out processes associated with exiting the enclave.

12. The method of claim 1, further comprising:
  providing an interface for obtaining a first trust declaration by the first application, the first trust declaration declaring whether the first application trusts any application to execute with the first application on the first physical processing unit.

13. The method of claim 12, further comprising:
  recording the first trust declaration in a memory space of the first physical processing unit.

14. The method of claim 12, further comprising:
  recording the first trust declaration in a memory space shared by all physical processing units of the processor.

15. The method of claim 12, further comprising:
  recording the first trust declaration in a memory space located outside of the processor.

16. The method of claim 1, wherein the processor comprises the first physical processing unit and at least one other physical processing unit.

17. The method of claim 1, wherein the first physical processing unit hosts the first logical processing unit and at least one other logical processing unit.

18. A device for executing applications, comprising:
  a processor including one or more physical processing units; and
  a computer-readable instruction code storage coupled to the one or more physical processing units and having instructions stored thereon that are executable by the one or more physical processing units to perform:
  assigning a first application to a first logical processing unit hosted on a first physical processing unit of the processor;
  providing a set of enclave entry instructions for the first logical processing unit to execute, to cause the first logical processing unit to enter an enclave when a predefined entering condition is satisfied, wherein the predefined entering condition is satisfied when all logical processing units hosted on the first physical processing unit are loaded with applications and all loaded applications are declared as trusted by the first application; and
  providing a set of enclave exit instructions for the first logical processing unit to execute, to cause the first logical processing unit to exit the enclave when a predefined exiting condition is satisfied.

19. A non-transitory computer-readable medium having stored therein instructions that, when executed by a processor of a device, cause the device to perform a method for executing applications, the method comprising:
  assigning a first application to a first logical processing unit hosted on a first physical processing unit of the processor;
  providing a set of enclave entry instructions for the first logical processing unit to execute, to cause the first logical processing unit to enter an enclave when a predefined entering condition is satisfied, wherein the predefined entering condition is satisfied when all logical processing units hosted on the first physical processing unit are loaded with applications and all loaded applications are declared as trusted by the first application; and
  providing a set of enclave exit instructions for the first logical processing unit to execute, to cause the first logical processing unit to exit the enclave when a predefined exiting condition is satisfied.

* * * * *